(12) United States Patent
Ishikawa et al.

(10) Patent No.: US 6,719,098 B1
(45) Date of Patent: Apr. 13, 2004

(54) STABILITY CONTROL APPARATUS FOR INDUSTRIAL VEHICLES

(75) Inventors: Kazuo Ishikawa, Kariya (JP); Kenji Sugiura, Kariya (JP); Masakatsu Suzuki, Kariya (JP); Takaki Ogawa, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/192,036

(22) Filed: Nov. 13, 1998

(30) Foreign Application Priority Data

Nov. 13, 1997 (JP) .............................. 9-312157

(51) Int. Cl.$^7$ ................................. B66F 9/06
(52) U.S. Cl. ................ 187/222; 187/223; 280/754; 280/755
(58) Field of Search ............... 187/222, 223; 280/754, 755; 414/636

(56) References Cited

U.S. PATENT DOCUMENTS

| | | | | | |
|---|---|---|---|---|---|
| 2,338,897 A | * | 1/1944 | Boulogne et al. | .... | 280/5.508 X |
| 4,264,014 A | * | 4/1981 | Hogg et al. | ............. | 280/754 X |
| 4,705,295 A | * | 11/1987 | Fought | ........................ | 280/754 |
| 5,177,681 A | * | 1/1993 | Sato | ..................... | 364/424.05 |
| 5,219,181 A | * | 6/1993 | Lund | ........................ | 280/5.508 |
| 5,447,331 A | * | 9/1995 | Barnhart | ..................... | 280/840 |
| 5,515,274 A | * | 5/1996 | Mine et al. | .......... | 280/5.508 X |
| 5,640,324 A | * | 6/1997 | Inagaki | ................ | 280/5.508 X |

FOREIGN PATENT DOCUMENTS

| | | | | |
|---|---|---|---|---|
| EP | 000498611 | * | 8/1992 | ................. 187/223 |
| JP | 55-165813 | | 12/1980 | |
| JP | 58-167215 | | 3/1983 | |
| JP | 58-211903 | | 9/1983 | |
| JP | 0183307 | * | 10/1983 | ................. 280/754 |
| JP | 58167218 | * | 10/1983 | |
| JP | 58-183307 | | 10/1983 | |
| JP | 582111903 | * | 12/1983 | |
| JP | 6-127897 | | 5/1994 | ............. B66F/9/22 |
| JP | 9-315125 | | 9/1997 | |
| SU | 1373587 | * | 2/1988 | ................. 280/755 |

* cited by examiner

Primary Examiner—Steven B. McAllister
(74) Attorney, Agent, or Firm—Morgan & Finnegan, LLP

(57) ABSTRACT

An apparatus for restricting pivoting of a pivotal axle in a forklift. The forklift has an axle that is supported pivotally relative to a body frame. A damper is arranged between the body frame and the axle to permit and restrict pivoting of the axle. An electromagnetic valve locks the damper to restrict pivoting of the axle. The axle is free to pivot when the pivot angle of the axle relative to the body frame exceeds a predetermined reference angle. A controller refers to the pivot angle and other factors relating to vehicle stability when deciding whether to restrict pivoting of the axle.

8 Claims, 9 Drawing Sheets

STABILITY CONTROL APPARATUS FOR INDUSTRIAL VEHICLES

BACKGROUND OF THE INVENTION

The present invention relates to an industrial vehicle, such as a forklift, having a body and an axle pivotally supported relative to the body, and more particularly, to an industrial vehicle having a stability control apparatus that restricts pivoting of the axle in accordance with traveling conditions and load conditions.

An industrial vehicle, such as a forklift, has a body and an axle, on which wheels are mounted. It is known that the employment of an axle pivotally supported with respect to the body stabilizes the vehicle when the vehicle is traveling. However, when the forklift turns to change directions, centrifugal force acts on the vehicle and applies a lateral force to the body. In such case, the pivotal axle tilts the body sideward. Thus, the vehicle may become unstable when the forklift turns.

Accordingly, Japanese Unexamined Patent Publication No. 58-211903 describes a mechanism for locking a pivotal rear axle. A turning detector detects the centrifugal force applied to the vehicle and locks the rear axle when the force exceeds a predetermined value. Since the rear axle is locked when the vehicle is turned, the lateral tilting of the body is suppressed. Thus, the forklift is stabilized when changing directions.

Japanese Unexamined Patent Publication No. 58-167215 describes an apparatus for actuating the axle locking mechanism. A forklift has forks to lift and carry loads.

The apparatus detects the weight of the load and the height of the forks. When the load is heavy and lifted to a high position, the vehicle's center of gravity is raised. Under these conditions, the apparatus actuates the axle locking mechanism and locks the rear axle to maintain the stability of the vehicle.

The present applicant has proposed installing a hydraulic damper between the rear axle and the vehicle body. The damper extends and retracts to permit pivoting of the axle relative to the body. Pivoting of the axle is restricted by locking the damper. Hydraulic oil flows through a hydraulic circuit when the damper extends or retracts. An electromagnetic valve is arranged in the circuit. The excitation and de-excitation of the electromagnetic valve shifts the damper between a locked state and an unlocked state. In this structure, the damper incorporates two functions, one as a shock absorber, when the axle is pivoted, and another as an axle lock, for restricting pivoting of the axle.

However, the rear axle may be locked as one of the vehicle's rear wheels rides over an irregularity such as a bump when a heavy load is lifted to a high position by the forklift. Under such conditions, the axle would be locked in a raised state. When the elevated rear wheel rides off the bump, the locked and raised rear wheel would remain elevated and away from the road surface. In this state, the vehicle's center of gravity is displaced toward the front. Furthermore, the body would be supported at three points by the two front wheels and by the other rear wheel. In such state, the stability of the vehicle decreases, which hinders stable driving of the forklift.

In addition, if the axle is unlocked with one of the rear wheels in an elevated state, the elevated wheel falls and impacts the road surface. This may be disconcerting to the operator.

The apparatus of Patent Publication No. 58-167215 includes a block inserted between the body and the rear axle to lock the axle. The block cannot be inserted when the axle is pivoted with respect to the body. Thus, the rear wheel cannot be locked in an elevated state.

However, in the apparatus having a locking damper, the rear axle would be locked by the electromagnetic valve regardless of whether the axle is pivoted if, for example, the carried load is heavy and lifted high. This would decrease the stability of the forklift.

This problem not only occurs when the vehicle's center of gravity is raised. The present applicant has proposed to lock the axle at an early stage depending on how the yaw rate changes (yaw acceleration) and how much lateral force is applied to the vehicle. The axle is locked when the yaw acceleration becomes large, that is, when the forklift operator begins to turn the steering wheel to start turning the vehicle. Therefore, the axle is locked in a substantially level state before the lateral force increases and starts to pivot the axle relative to the body. However, if the axle is locked with one of the rear wheels raised as the forklift turns, the stability of the vehicle will be reduced.

Furthermore, if one of the rear wheels rides over a bump while the axle is locked, the body is lifted by about twice as much in comparison to when the axle is unlocked. This decreases the stability of the vehicle in the longitudinal direction. Additionally, the damper does not function to absorb shocks when the axle is locked. Thus, the stability of the vehicle is greatly affected by the road surface.

SUMMARY OF THE INVENTION

Accordingly, it is a first objective of the present invention to provide a stability control apparatus for industrial vehicles that maintains vehicle stability if the axle is locked while in an irregularly pivoted position relative to the vehicle body. It is a second objective of the present invention to maintain vehicle stability if the axle is locked when the vehicle's center of gravity is raised with the axle in an irregularly pivoted position relative to the vehicle body. It is a third objective of the present invention to maintain vehicle stability by preventing locking of the axle when one of the associated wheels is raised and by suspending locking of the axle until the associated wheels are all located on level ground. It is a fourth objective of the present invention to reduce the influence the road surface has on the vehicle body when the vehicle is traveling while the axle is locked. It is a fifth objective of the present invention to maintain vehicle stability if the axle is unlocked after having been locked due to the raising of the vehicle's center of gravity. It is a sixth objective of the present invention to maintain vehicle stability, at least when the vehicle is not moving, while the axle is pivoted relative to the body and while the vehicle's center of gravity is raised.

To achieve the above objectives, the present invention provides an apparatus for controlling stability in an industrial vehicle. The apparatus includes an axle supported to pivot vertically relative to a body of the vehicle. A restricting mechanism restricts pivoting of the axle. An operating status sensing device senses either the status of the vehicle's motion when the vehicle turns or the status of a load carried by the vehicle. A pivot angle detector detects the pivot angle of the axle relative to the body. A controller selectively actuates and de-actuates the restricting mechanism based on the state detected by the status sensing device and the pivot angle.

In a further aspect of the present invention, a method for controlling the stability of an industrial vehicle is provided.

The vehicle has a pivotal axle and a restriction mechanism. The restriction mechanism is located and connected between the axle and a body of the vehicle. The restriction mechanism locks and releases the pivotal axle. The method includes the step of sensing the operating status of the vehicle. The operating status includes at least one of a sensed load characteristic that is indicative of the position of the vehicle's center of gravity, the vehicle's yaw acceleration, and the centrifugal force acting on the vehicle. The method further includes the step of sensing the pivot angle of the axle with respect to a reference plane. The reference plane includes the pivot axis of the axle and is fixed with respect to the body. The method also includes the step of selectively locking and releasing the restriction mechanism depending of the operating status of the vehicle and the pivot angle. The pivotal axle is released when the absolute value of the pivot angle exceeds a predetermined value.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
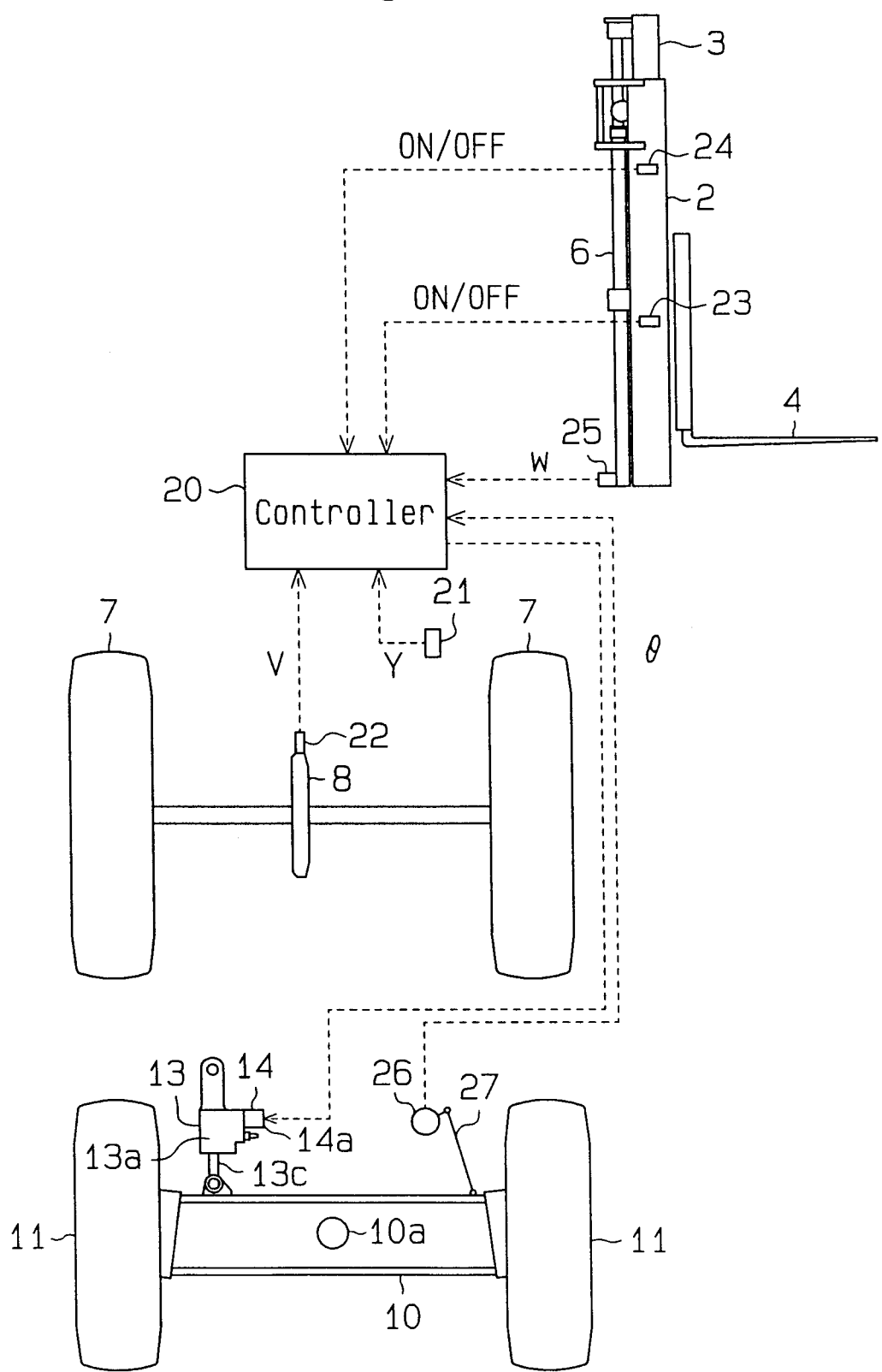
FIG. 1 is a diagrammatic view showing a first embodiment of a stability control apparatus according to the present invention.
Figure 2:
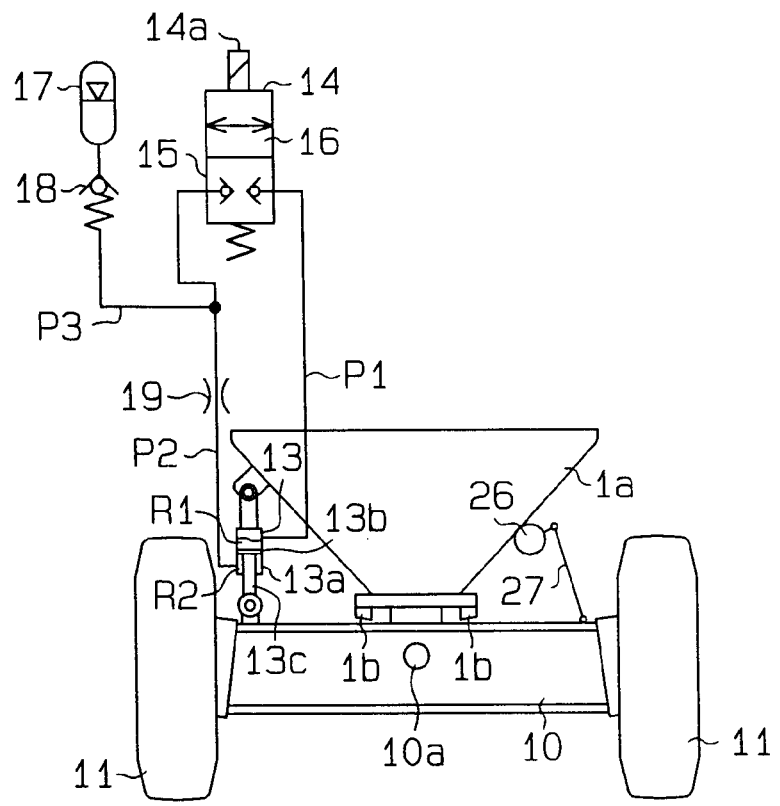
FIG. 2 is a diagrammatic rear view showing a mechanism for restricting axle pivoting.
Figure 3:
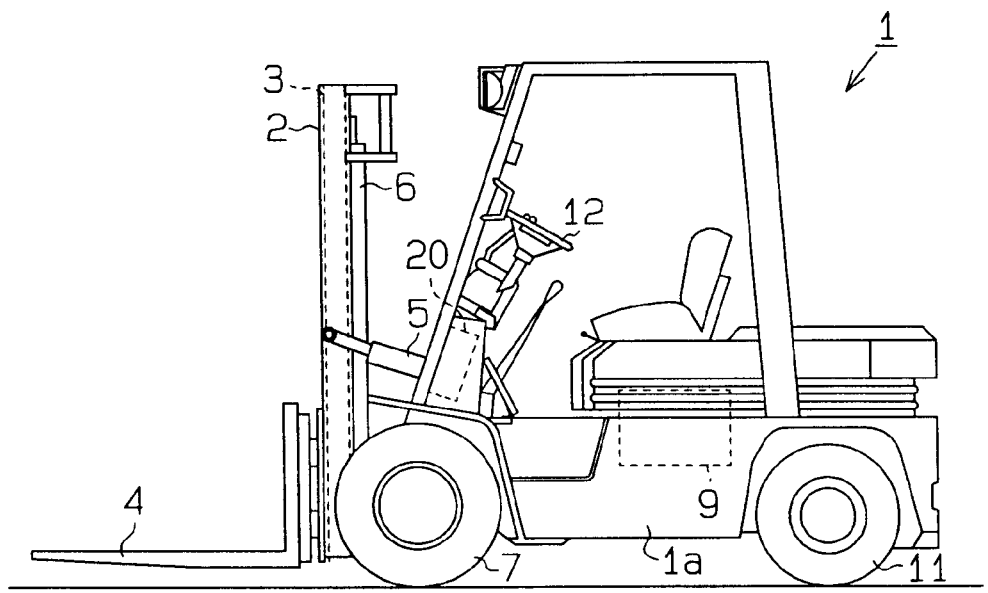
FIG. 3 is a side view showing a forklift.

A first embodiment according to the present invention will now be described with reference to FIGS. 1 to 8. In this embodiment, the industrial vehicle incorporating the invention is a forklift truck 1. The forklift 1 is a front drive, rear steering, four wheel vehicle. As shown in FIG. 3, an inner mast 3 is supported such that it can be lifted and lowered between a pair of outer masts 2. Forks 4 are supported by the inner mast 3. A sprocket (not shown) is arranged on the upper portion of the inner mast 3 and connected to the forks 4 by a chain (not shown) to lift and lower the forks 4. The outer mast 2 is tiltably coupled to a body, or body frame 1a, by a tilt cylinder 5. A lift cylinder 6 moves the inner mast 3 vertically to lift and lower the forks 4.

Left and right front wheels 7 are operably connected to and thus driven by an engine 9 by means of a differential ring gear (shown in FIG. 1) and a transmission (not shown). As shown in FIGS. 1 and 2, a rear axle 10 extends laterally at the lower rear portion of the body frame 1a and is pivotal about a center pin 10a. Left and right rear wheels 11 are mounted on the rear axle 10 and steered by a steering wheel 12 by means of a steering cylinder (not shown).

As shown in FIG. 2, a hydraulic damper (hydraulic cylinder) 13 connects the body 1a and the rear axle 10. The damper 13 includes a cylinder 13a, which is coupled to the body frame 1a, and a piston 13b, which is housed in the cylinder 13a, and a piston 13c, which extends from the piston 13c and is connected to the rear axle 10.

The damper 13 is connected to an electromagnetic valve 14, which has a solenoid 14a, by way of a first passage P1 and a second passage P2. The piston 13b defines a first chamber R1 and a second chamber R2 in the cylinder 13a. The first chamber R1 is connected with the first passage P1, while the second chamber R2 is connected with the second passage P2. The electromagnetic valve 14 is a two port, two position switching valve, which is normally closed and includes a spool. The spool has a disconnection portion 15 and a connection portion 16. A third passage P3 extending from the second passage P2 is connected to an accumulator 17, which stores hydraulic oil, by way of a check valve 18. The accumulator 17 compensates for loss of hydraulic oil, due to leakage or other reasons. A throttle valve 19 is arranged in the second passage P2.

The spool of the electromagnetic valve 14 is shown in the disconnection position in FIG. 2. In this state, the movement of hydraulic oil between the first and second chambers R1, R2 is prohibited thus locking, or restricting, the rear axle 10. If the spool is moved to the connection position, the movement of the hydraulic oil between the chambers R1, R2 is permitted thereby allowing the rear axle 10 to pivot freely. A pair of stoppers 1b are provided on the lower portion of the body frame 1a to restrict the pivoting of the rear axle 10 within a maximum range of ±4 degrees. The electromagnetic valve is controlled by a controller 20, which is installed at the front portion of the body as shown in FIG. 3.

As shown in FIG. 1, a yaw rate sensor 21, a vehicle velocity sensor 22, height sensors 23, 24, a pressure sensor 25, and a pivot angle sensor 26 (pivot angle detecting means) are installed in the forklift 1. The sensors 21–26 detect the current traveling and load state of the forklift 1 to control pivoting of the rear axle 10. Each sensor 21–26 is connected to the controller 20. The sensors 21, 22 serve as a motion status detector, while the sensors 23, 24 serve as a load status detector.

The yaw rate sensor 21 is installed on the front portion of the body, together with the controller 20, and is oriented in a predetermined direction to detect the yaw rate (angular acceleration) Y (rad/sec) of the body. A gyroscope (e.g., piezoelectric type, or an optical type gyroscope) may be employed as the yaw rate sensor 21.

The vehicle velocity sensor 22 detects the rotating speed of the differential gear 8 and thus indirectly detects the velocity V of the forklift 1. The value detected by the vehicle velocity sensor 22 is sent to the controller 20.

The height sensors 23, 24 are each attached to the outer masts 23, 24 at different heights. Limit switches may be employed as the height sensors 23, 24. The forks 4 may be lifted to a maximum height $H_{max}$ of about five meters to six meters. The first height sensor 23 is actuated when the forks 4 are lifted to two meters or higher, while the second height sensor 24 is actuated when the forks 4 are lifted to four meters or higher. Thus, the states of the two height sensors 23, 24 indicate the height range in which the forks 4 are located. The forks 4 are located in a low height range when positioned between a height of zero meters to two meters, an intermediate height range when positioned between a height of two meters to four meters, and a high height range when positioned at a height of four meters or higher.

The pressure sensor 25 is arranged at the bottom portion of the lift cylinder 6 to detect the hydraulic pressure in the cylinder 6. The hydraulic pressure of the lift cylinder 6 is proportional to the weight w of the load carried on the forks 4. Thus, the load weight w can be indirectly detected by the pressure sensor 25. The value detected by the pressure sensor 25 is sent to the controller 20.

As shown in FIGS. 1 and 2, the pivot angle sensor 26 is supported at one side of the body frame 1a to detect the pivot angle θ of the rear axle 10. A potentiometer may be employed-as the pivot angle sensor 26. Pivoting of the rear axle 10 is converted to a rotary movement by a link mechanism 27. Thus, the pivot angle sensor 26 detects the rotary movement to obtain the pivot angle θ. The value detected by the pivot angle sensor 26 is sent to the controller 20. The pivot angle θ is a value indicating the angle of the rear axle 10 with respect to a horizontal plane (zero degrees) that includes the axis of the center pin 10a when the body frame 1a is level. Furthermore, the pivot angle θ is included in the range of $-4° \leq \theta \leq 4°$.

Figure 4:
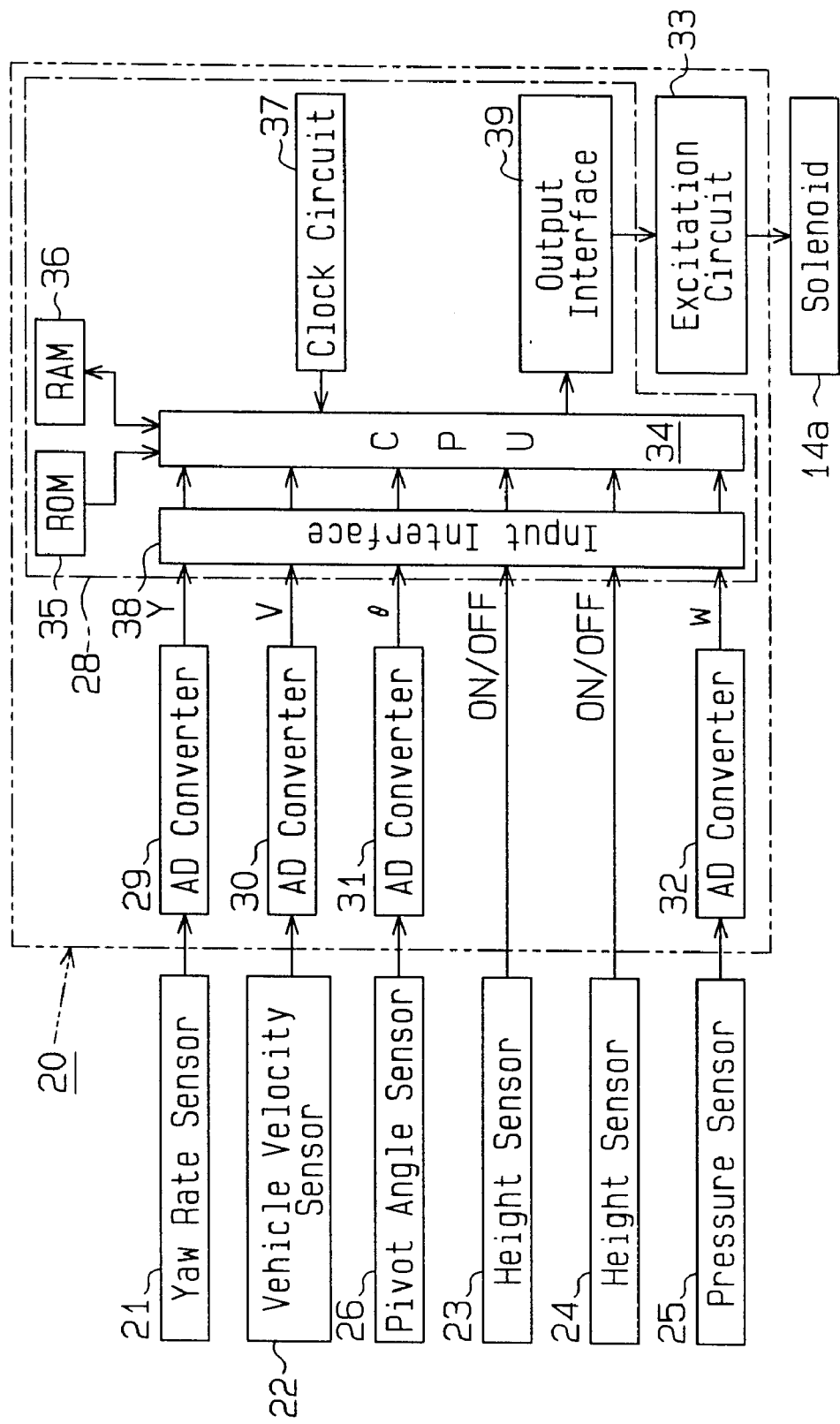
FIG. 4 is a block diagram showing the electric structure of the stability control apparatus.

The electric structure of the forklift 1 will now be described with reference to FIG. 4. The controller 20 incorporates a microcomputer 28, analog-to-digital (A/D) converters 29, 30, 31, 32, and an excitation circuit 33. The microcomputer 28 includes a central processing unit (CPU) 34, a read only memory (ROM) 35, a random access memory (RAM) 36, a clock circuit 37, an input interface 38, and an output interface 39.

The CPU 34 receives the values detected by the sensors 21, 22, 25, 26 by way of the A/D converters 29, 30, 31, 32, respectively. The CPU 34 also receives the ON/OFF signals produced by the height sensors 23, 24. Based on the values sent from the sensors 21, 22, 25, 26, the CPU 34 obtains the yaw rate Y (the angular velocity of the vehicle when the vehicle turns), the vehicle velocity V, the load weight w, and the axle pivot angle θ. The CPU 34 also refers to the signals sent from the height sensors 23, 24 to confirm the height of the forks 4 and judge the height range in which the forks 4 are positioned. In addition, the CPU judges whether the load weight w is light ($w<w_O$) or heavy ($w \geq w_O$).

The CPU 34 sends signals to the excitation circuit 33 to excite or de-excite the solenoid 14a and control the electromagnetic valve 14. The excitation circuit 33 stops the flow of current to the solenoid 14a when receiving a de-excitation signal (locking signal) from the CPU 34 and starts the flow of current when receiving an excitation signal (unlocking signal) from the CPU 34.

Figure 7:
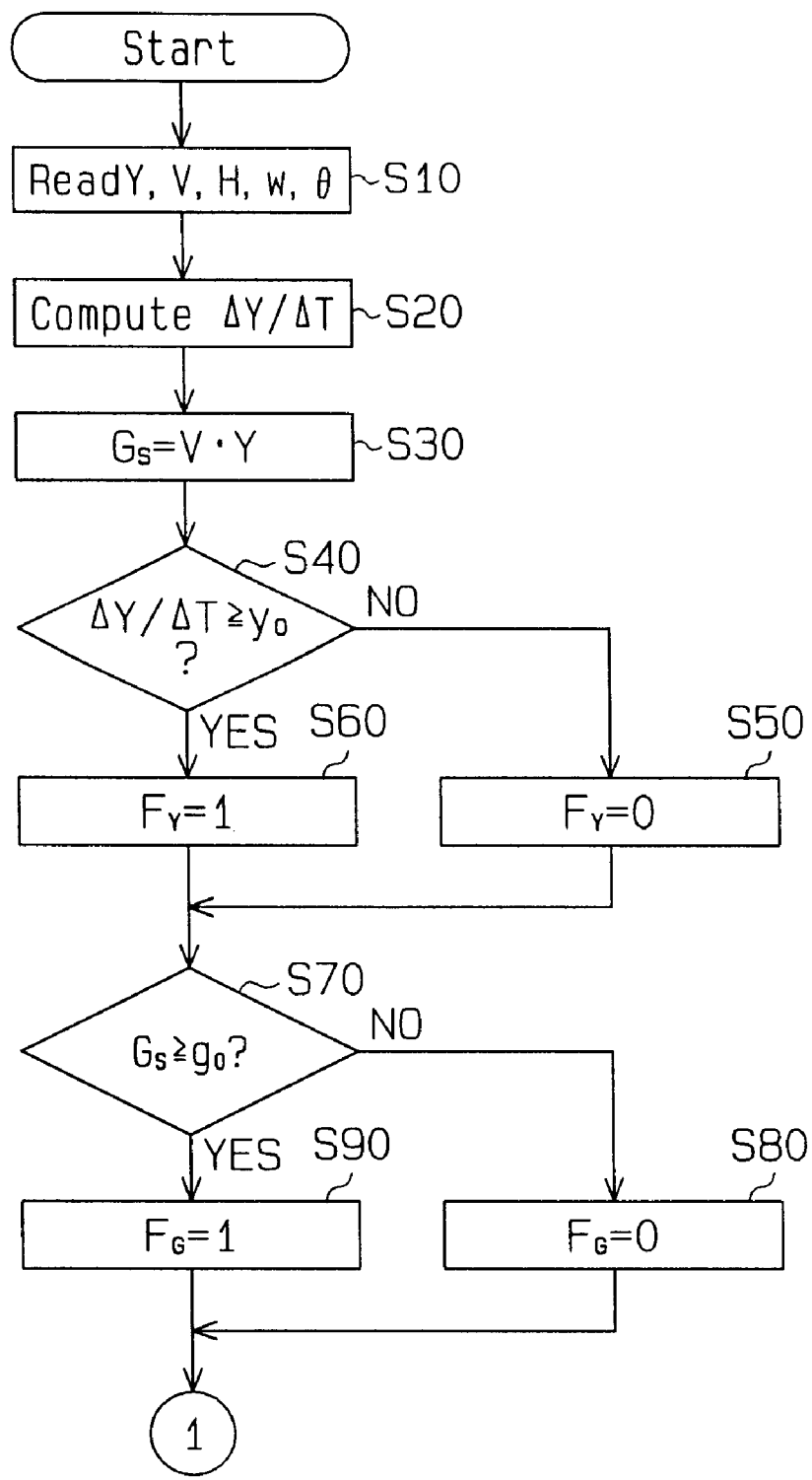
FIG. 7 is a flowchart showing the steps performed when executing pivot control.
Figure 8:
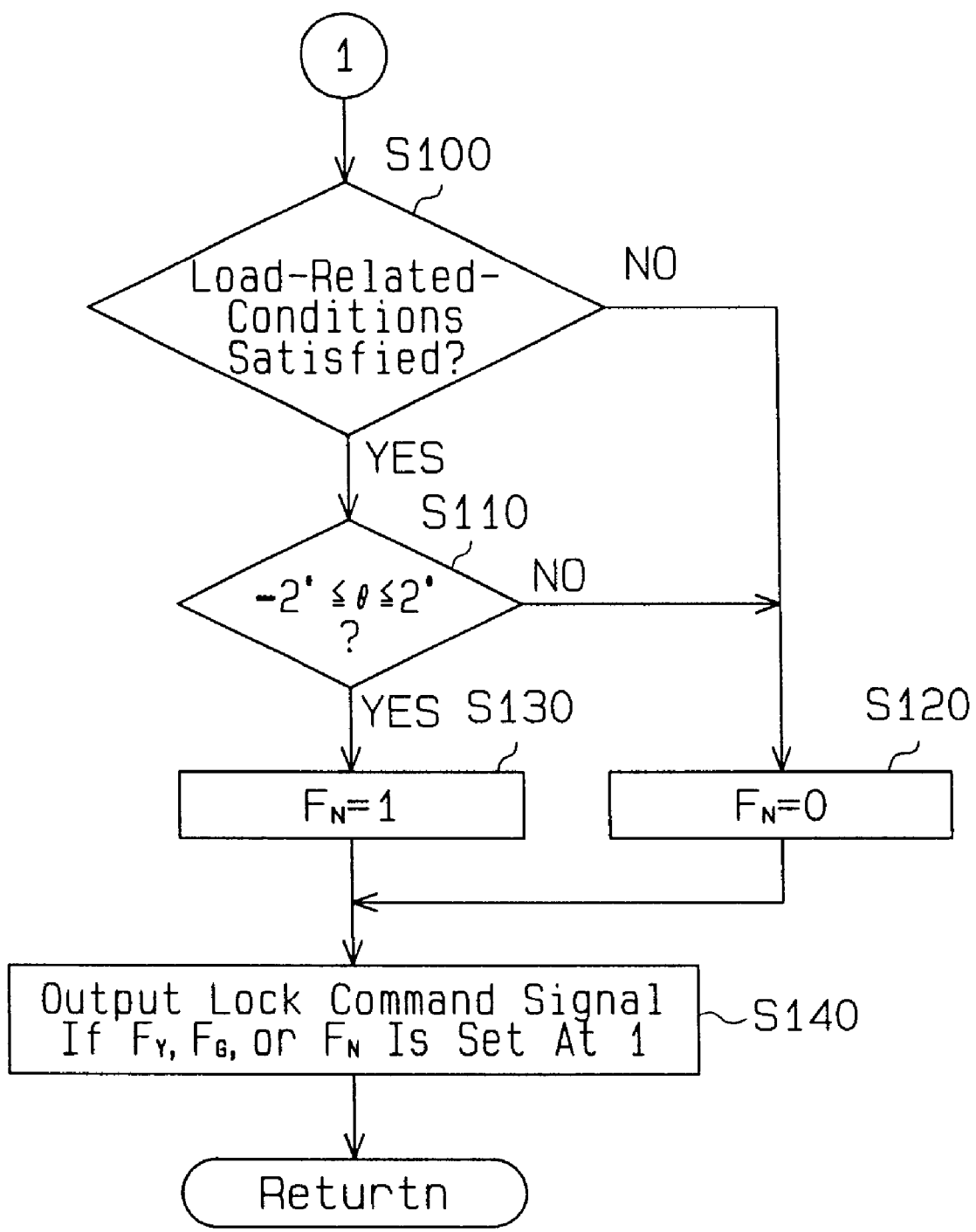
FIG. 8 is a continuation of the flowchart of FIG. 7.

The ROM 35 stores an axle pivot control program, which is shown in the flowcharts of FIGS. 7 and 8. The CPU 34 executes the program in a cyclic manner at predetermined time intervals (e.g., 10 to 90 milliseconds).

Lateral acceleration (the centrifugal acceleration applied to the vehicle when the vehicle turns) $G_S$, which is computed by a first detection device, and yaw acceleration $\Delta Y / \Delta T$, which indicates the rate of change of the yaw rate Y and which is computed by a second computing device, are used as physical quantities for detecting the traveling state of the forklift 1. The first computing device computes the lateral acceleration $G_S$ from the yaw rate Y and the vehicle velocity V using the equation $G_S = V \cdot Y$. The second computing device obtains the yaw acceleration $\Delta Y / \Delta T$ by obtaining the difference between the previous yaw rate Y and the current yaw rate Y. The forklift 1 enters a first traveling state when the lateral acceleration $G_S$ becomes equal to or higher than a threshold value $g_O$ or when the yaw acceleration $\Delta Y / \Delta T$ becomes equal to or higher than a threshold value $y_O$. In such state, the rear axle 10 is locked, or restricted from pivoting.

The rear axle 10 is also locked when the load carried by the forklift 1 is heavy and lifted to a high position thus raising the vehicle's center of gravity. However, with reference to FIG. 6, the rear axle 10 remains unlocked if the absolute value of the pivot angle θ exceeds two degrees (θ<2° or θ<−2°. If the absolute value of the pivot angle θ is equal to or smaller than two degrees, both left and right rear wheels 11 contact the road surface even when the rear axle 10 is locked. Thus, under such conditions, the rear axle 10 may be locked without significantly affecting the stability of the forklift 1.

Figure 5:
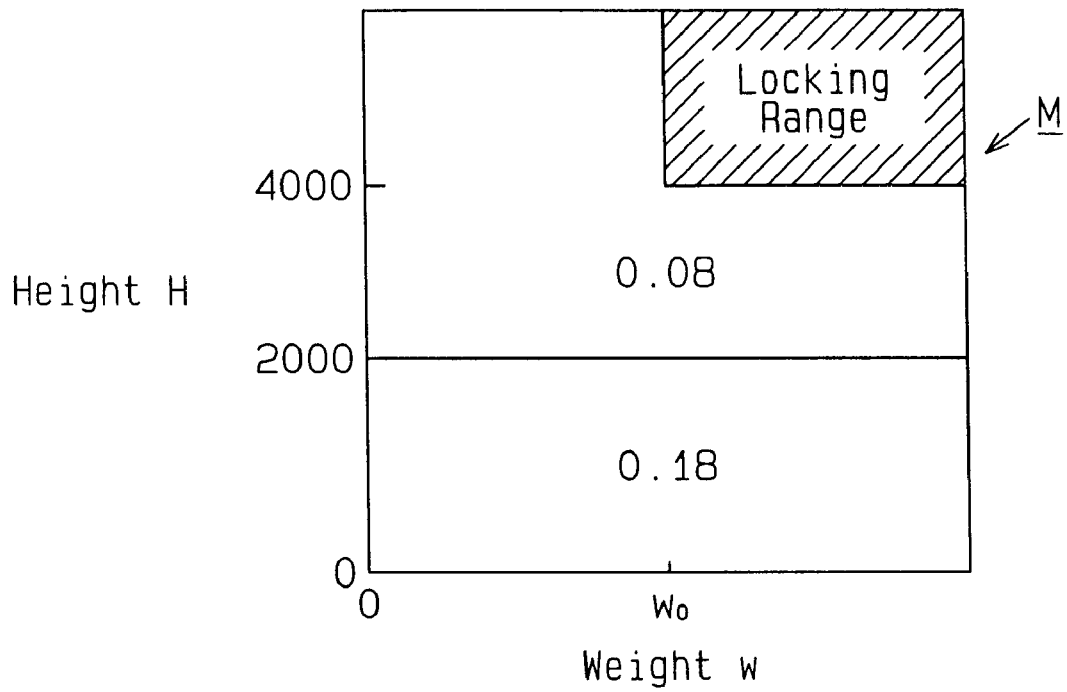
FIG. 5 is a map referred to during the execution of pivot control.
Figure 6:
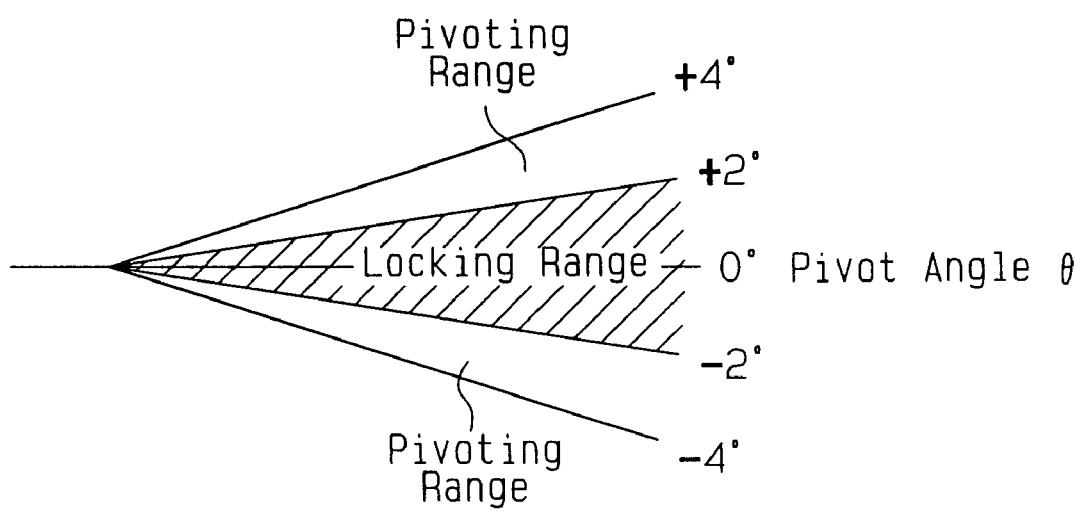
FIG. 6 is a chart showing the relationship between the pivot angle and the locking conditions.

The map illustrated in FIG. 5, which shows the relationship between the load weight w and load height H, is referred to when locking the rear axle 10 based on the state of the carried load and when determining the lateral acceleration threshold value $g_O$ and the yaw acceleration threshold value $y_O$. The rear axle 10 is locked when the carried load is heavy ($w \geq w_O$) and lifted to a high position ($H \geq H_O$), that is when the forklift 1 enters a first load state. The lateral acceleration threshold value $g_O$ is selected from two values. When the forks 4 are in the low height range (between zero to two meters), the threshold value $g_O$ is set at a certain value (e.g., 0.18(N)). When the forks 4 are in the intermediate height range (two to four meters) or when the forks 4 are in the high height range (four meters or higher) while carrying a light load ($w<w_O$), the threshold value $g_O$ is set at another value (e.g., 0.08(N)). Each threshold value $g_O$, $y_O$ are values for ensuring stability and are obtained through experiments or theoretical calculations. The actual values used for the threshold values $g_O$, $y_O$ may be changed arbitrarily in accordance with the type of vehicle or other relevant conditions.

The CPU 34 stores three flags $F_Y$, $F_G$, and $F_N$. Flag $F_Y$ is set at the value of one when the forklift 1 enters the first traveling state, that is, when the yaw acceleration $\Delta Y / \Delta T$ is equal to or higher than a threshold value $y_O$. Flag $F_G$ is set at the value of one when the lateral acceleration $G_S$ is equal to or greater than the threshold value $g_O$. Flag $F_N$ is set at the value of one when the forklift 1 enters the first load state, that is, when the rear axle 10 is locked.

The pivot control program executed by the CPU 34 will now be described with reference to the flowchart illustrated in FIGS. 7 and 8. When executing the program, the CPU 34 first performs step S10 and reads the yaw rate Y, the vehicle velocity V, the load height H, the load weight w, and the pivoting angle θ. At step S20, the CPU 34 computes the yaw acceleration $\Delta Y / \Delta T$. The yaw acceleration $\Delta Y / \Delta T$ is computed by obtaining the difference between the previous yaw rate Y and the current yaw rate Y. At step S30, the CPU 34 computes the lateral acceleration G, using the equation $G_S = V \cdot Y$.

At step S40, the CPU 34 judges whether or not the yaw acceleration $\Delta Y/\Delta T$ is equal to or greater than the threshold value $y_O$. When it is determined that the yaw acceleration $\Delta Y/\Delta T$ is not equal to or greater than the threshold value $y_O$ in step S40, the CPU 34 proceeds to step S50 and resets the flag $F_Y$ to the value of zero. If it is determined that the yaw acceleration $\Delta Y/\Delta T$ is equal to or greater than the threshold value $y_O$ in step S40, the CPU 34 proceeds to step S60 and sets the flag $F_Y$ to one.

At step S70, the CPU 34 judges whether the lateral acceleration locking condition ($G_S \geq g_O$) is satisfied. The CPU 34 refers to map M, which is illustrated in FIG. 5, to obtain the lateral acceleration $g_O$ in accordance with the load weight w and load height H. If the load height H is in the low range (zero to two meters), the threshold value $g_O$ is set at 0.08(N). If the load height H is in the intermediate range (two to four meters) or in the high range (four meters or higher) when the load weight w is light ($w < w_O$), the threshold value $g_O$ is set at 0.18(N).

If it is determined that the lateral acceleration locking condition ($G_S \geq g_O$) is not satisfied in step S70, the CPU 34 proceeds to step S80 and resets the flag $F_G$ to the value of zero. On the other hand, if it is determined that the lateral acceleration locking condition ($G_S \geq g_O$) is satisfied in step S70, the CPU 34 proceeds to step S90 and sets the flag $F_G$ to the value of one.

At step S100, the CPU 34 judges whether or not the load-state-related locking conditions are satisfied. That is, the CPU 34 judges whether the carried load is heavy ($w \geq w_O$) and lifted to a high position ($H \geq 4$ m). If it is determined that the load-state-related locking conditions are not satisfied in step S100, the CPU 34 proceeds to step S120 and resets the flag $F_N$ to the value of zero. On the other hand, if it is determined that the load-state-related locking conditions are satisfied in step S100, the CPU 34 proceeds to step S110. At step S110, the CPU 34 judges whether or not the pivot angle $\theta$ is included in the range of $-2° \leq \theta \leq 2°$. If it is determined that the pivot angle $\theta$ is not included in the range of $-2° \leq \theta \leq 2°$, that is, if it is determined that the pivot angle $\theta$ is smaller than minus two degrees or greater than two degrees in step S110, the CPU 34 proceeds to step S120 and resets the flag $F_N$ to the value of zero. If it is determined that the pivot angle $\theta$ is included in the range of $-2° \leq \theta \leq 2°$ in step S110, the CPU 34 proceeds to step S130 and sets the flag $F_N$ at the value of one. Once the flag $F_N$ is set at the value of one, the rear axle 10 remains locked until the load-state-related locking conditions are no longer met regardless of the pivot angle $\theta$.

At step S140, the CPU 34 generates a locking command (locking signal) if any one of the flags $F_Y$, $F_G$, $F_N$ is set at one.

The rear axle 10 is not locked if one of the rear wheels 11 rides over an irregularity, such as a bump, and is thus elevated, unless the absolute value of the rear axle pivot angle $\theta$ is smaller than two degrees even if the load is heavy and lifted to a high position(first load state). In other words, the rear axle 10 is permitted to pivot freely. Thus, as the elevated rear wheel 11 rides off the bump and onto a level road surface, the rear axle 10 pivots such that the rear wheel 11 descends toward the road surface. When the absolute value of the pivot angle $\theta$ becomes less than two degrees, the rear axle 10 is locked. However, in this state, the rear wheel 11 can contact the road surface. Thus, the forklift 1 is supported at four points, by the two front wheels and by the two rear wheels. Since neither rear wheel 11 remains elevated away from the road surface, the forklift 1 is stable. Furthermore, if any of the rear wheels 11 are elevated when riding over a bump, the rear wheel 11 returns slowly to the road surface after riding off the bump. Thus, the force of the impact produced when the rear wheel 11 contacts the road surface is reduced.

Pivoting of the rear axle 10 is permitted if the absolute value of the pivot angle $\theta$ exceeds two degrees. However, the pivot angle $\theta$ is restricted to a maximum absolute value of four degrees by the abutment between the rear axle 10 and the stoppers 1b. Furthermore, if the pivot angle $\theta$ of the rear axle 10 is included in the range of $-2° \leq \theta \leq 2°$, the rear axle 10 is locked when the carried load is heavy and lifted to a high position. Therefore, when the vehicle's center of gravity is raised, the rear axle 10 is locked in most cases. This suppresses lateral tilting of the forklift 1 and maintains vehicle stability when the forklift 1 carries loads.

As the forklift 1 travels, the electromagnetic valve 14 locks the rear axle 10 if the yaw acceleration $\Delta Y/\Delta T$ becomes equal to or higher than the threshold value $y_O$ or if the lateral acceleration $G_S$ becomes equal to or higher than the threshold value $g_O$. Thus, if the forklift 1 begins to turn when changing directions, the rear axle 10 is locked when the yaw acceleration $\Delta Y/\Delta T$ becomes equal to or higher than the threshold value $y_O$ even if the lateral acceleration $G_S$ has not become equal to or higher than the threshold value $g_O$. In other words, the rear axle 10 is locked in an initial stage when the forklift 1 turns. Therefore, the rear axle 10 is still substantially horizontal and parallel to the body frame ($\theta \approx 0$) when locked. Furthermore, if the forklift 1 is successively steered in two different directions (e.g., first toward the right and then toward the left), the value of the lateral acceleration $G_S$ falls to zero when changing directions. However, the yaw acceleration $\Delta Y/\Delta T$ remains equal to or greater than the threshold value $y_O$ when the steering wheel 12 is being turned. Thus, the forklift 1 maintains stability even if the forklift 1 turns in different directions successively. This embodiment may be modified such that when a heavy load is lifted to a high position, the rear axle 10 is locked if the lateral acceleration $G_S$ becomes equal to or greater than the threshold value $g_O$ or if the yaw acceleration $\Delta Y/\Delta T$ becomes equal to or greater than the threshold value $y_O$. As described above, the first embodiment has the following advantages.

(a) When the absolute value of the rear axle pivot angle $\theta$ exceeds two degrees as one of the rear wheels 11 rides over an irregularity such as a bump, the rear axle 10 is permitted to pivot freely, even if the load carried by the forklift 1 is heavy and lifted to a high position. Thus, as the rear wheel 11 rides off the bump, the wheel 11 contacts the road surface. Accordingly, all four wheels contact the road surface and maintain vehicle stability.

(b) The rear wheels 11 are prevented from being elevated away from the road surface. This stabilizes the forklift 1. This avoids a state in which the unlocking of the rear axle 10 would cause an elevated rear wheel 11 to fall onto the road surface resulting with a strong impact (e.g., when a heavy load is unloaded at a high position and the forks 4 are lowered afterward).

(c) A raised rear wheel 11 would return to the road surface slowly after riding off the bump. Thus, a strong impact that would be caused if the rear wheel 11 falls to the road surface is prevented.

(d) The rear axle 10 is locked if the absolute value of the pivot angle θ is two degrees or lower when the load carried by the forklift 1 is heavy and lifted to a high position. Thus, if the vehicle's center of gravity is raised when the carried load is heavy and lifted to a high position, the locking of the rear axle 10 suppresses lateral tilting of the body and maintains vehicle stability when transferring a load.

(e) Once the rear axle 10 is locked due to the state of the load, the rear axle 10 remains locked until the weight w of the load becomes light or the height H of the load becomes low, that is, until the vehicle's center of gravity is lowered. Thus, the forklift 1 remains stable when the rear axle 10 is unlocked.

(f) When locking the rear axle 10, priority is given to the traveling-state-related locking conditions to guarantee vehicle stability. Thus, as long as the yaw acceleration $\Delta Y/\Delta T$ is equal to or greater than the threshold value $y_O$ or the lateral acceleration $G_S$ is equal to or greater than the threshold value $g_O$, the rear axle 10 is kept locked regardless of whether the absolute value of the pivot angle θ exceeds two degrees when the carried load is heavy and lifted to a high position.

(g) By adding the locking control function to the conventional damping function, the damper 13 solves the problems of the prior art and maintains vehicle stability.

A second embodiment according to the present invention will now be described with reference to FIGS. 9 and 10. The structure of this embodiment is the same as that of the first embodiment, however, some steps performed when executing axle pivot control are different. To avoid a redundant description, like or same reference numerals are given to those components and steps that are the same as the corresponding components and steps of the first embodiment.

Figure 9:
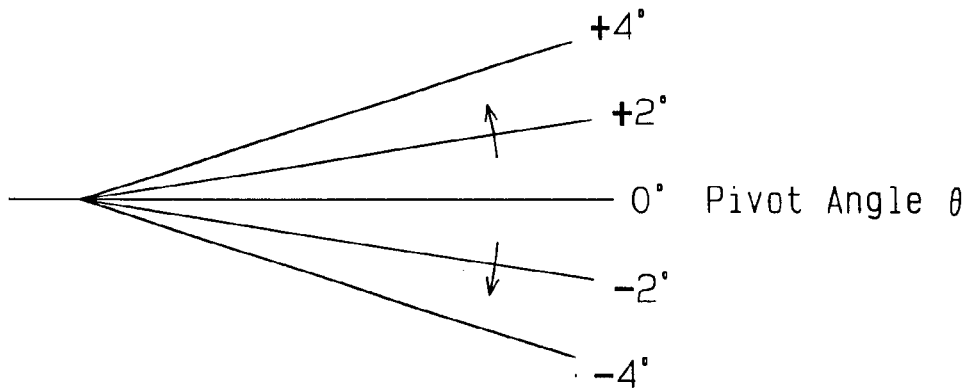
FIG. 9 is a chart showing the relationship between the pivot angle and the locking conditions in a second embodiment according to the present invention.
Figure 10:
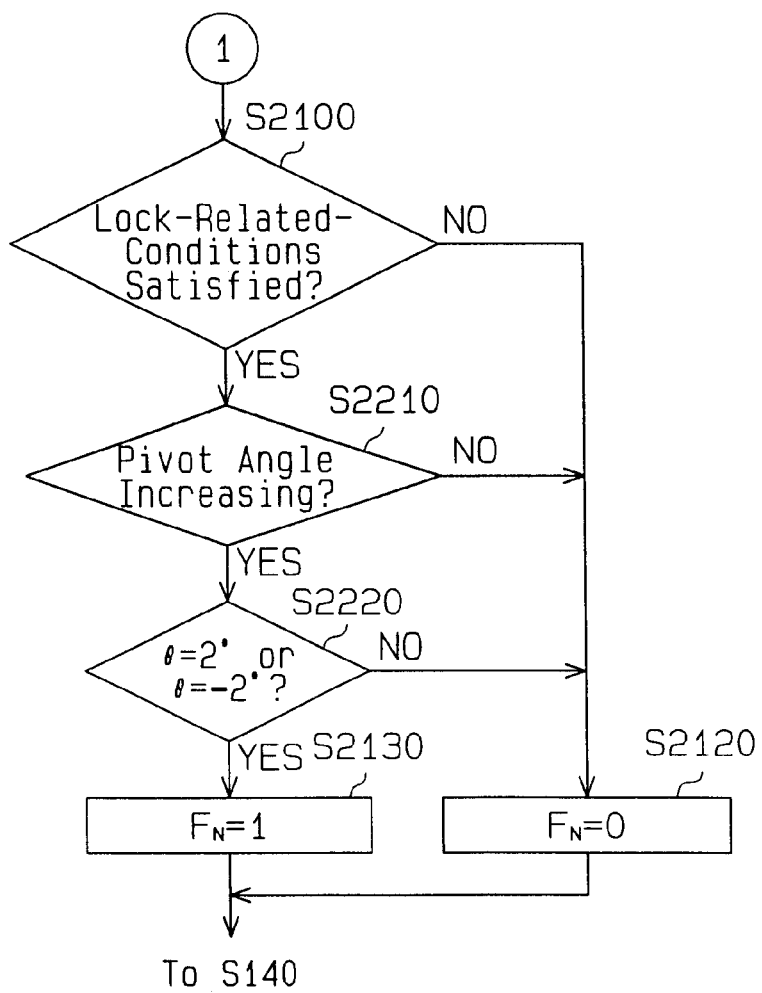
FIG. 10 is a continuation of the flowchart of FIG. 7 in a second embodiment.

As shown by the arrows in FIG. 9, when the pivot angle θ is first included in the range of $-2°<θ<2°$ but then moves out of this range such that the absolute value of the pivot angle θ increases to two degrees (θ=±2°), the CPU 34 locks the rear axle 10 when the load-related-locking conditions have been satisfied. Afterward, the rear axle 10 remains locked regardless of the pivot angle θ until the load-related-locking conditions are no longer satisfied.

In this embodiment, the program for axle pivot control, which is stored in the ROM 35, incorporates steps S10 to S90, which are illustrated in FIG. 7. The steps performed subsequently are illustrated in the flowchart of FIG. 10.

At step S2100, the CPU 34 judges whether or not the load-related-locking conditions are satisfied. If it is determined that the load-related-locking conditions are satisfied, the CPU 34 proceeds to step S2210 and judges whether or not the absolute value of the pivot angle θ is increasing. The CPU 34 determines whether the pivot angle θ is increasing by comparing the preceding and current pivot angles θ. If it is determined that the absolute value of the pivot angle θ is not increasing, the CPU 34 proceeds to step S2120 and resets the flag $F_N$ to zero. If it is determined that the absolute value of the pivot angle θ is increasing, the CPU 34 proceeds to step S2220.

At step S2220, the CPU 34 judges whether or not the pivot angle θ is −2° or 2°. If it is determined that the pivot angle θ is neither −2° nor 2°, the CPU 34 proceeds to step S2120 and resets the flag $F_N$ to zero. If it is determined that the pivot angle θ is either −2° or 2°, the CPU 34 proceeds to step S2130 and sets the flag $F_N$ to one. Thus, the rear axle 10 is permitted to pivot freely if the pivot angle θ remains in the range of $-2°\leq θ \leq 2°$. This prevents the road surface from affecting the stability of the vehicle if the forklift 1 travels while carrying a heavy load lifted to a high position. Accordingly, the riding comfort is also improved since the rear axle 10 is permitted to absorb impacts produced between the rear wheels 11 and the road surface.

As the body tilts laterally such that the absolute value of the pivot angle θ reaches 2° when the carried load is heavy and lifted to a high position, the rear axle 10 is locked. Thus, if the forklift 1 is transferring a heavy load lifted to a high position and the body starts to tilt laterally, the tilting is stopped at 2°. This maintains the stability of the forklift 1 when transferring loads.

Furthermore, if one of the rear wheel 11 rides over a bump, the elevated amount of the rear body portion of the forklift 1 is about half of that of the forklift 1 of the first embodiment, which locks the rear axle 10 in such case. This improves the stability of the forklift 1 in the longitudinal direction. However, since the rear axle 1 remains unlocked, the forklift 1 of the first embodiment has superior stability in the lateral direction when the front wheels 7 ride over a bump.

If the forks 4 lift a heavy load to a high position when one of the rear wheel 11 rides over a bump and causes the absolute value of the pivot angle θ to be in the range of $2°<θ\leq 4°$, the rear axle 10 continues to pivot freely. Thus; as the forklift 1 moves and the elevated rear wheel 11 rides off the bump, the rear wheel 11 follows the road surface and descends to a level surface. This stabilizes the vehicle. In this state, the rear axle 10 is locked when the absolute value of the pivot angle θ is 2°.

In the second embodiment, the rear axle 10 pivots freely when the forklift 1 travels along a substantially flat road surface ($-2°<θ<2°$) while carrying a heavy load lifted to a high position. Therefore, although the forklift 1 of the first embodiment has superior stability in the lateral direction of the vehicle, the forklift 1 of this embodiment is not affected by the road surface. This improves the riding comfort of the forklift 1. Furthermore, since the rear axle 10 remains unlocked when the rear axle 10 of the first embodiment would be locked, the elevated amount of the rear portion of the forklift body in the second embodiment is about half of that of the first embodiment. This stabilizes the vehicle more in the longitudinal direction in comparison to the forklift of the first embodiment. Furthermore, the advantages (a) to (c), and (e) to (d) of the first embodiment are also attained in the second embodiment.

Figure 11:
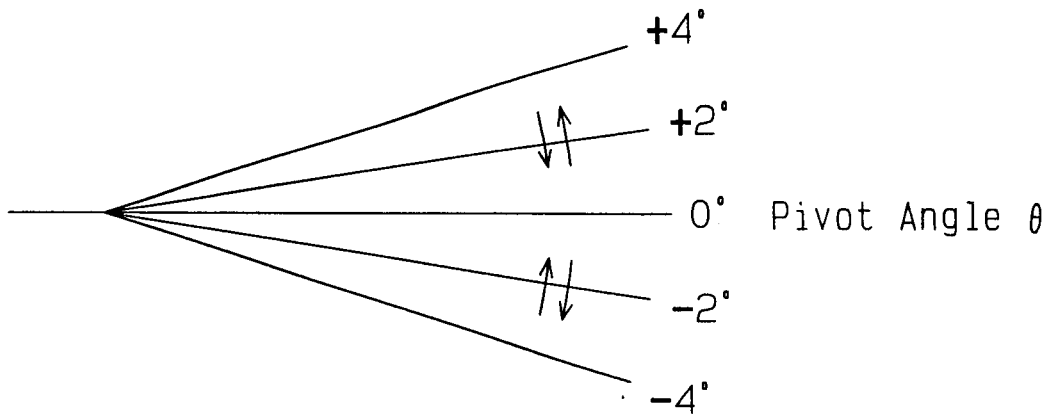
FIG. 11 is a chart showing the relationship between the pivot angle and the locking conditions in a third embodiment according to the present invention.
Figure 12:
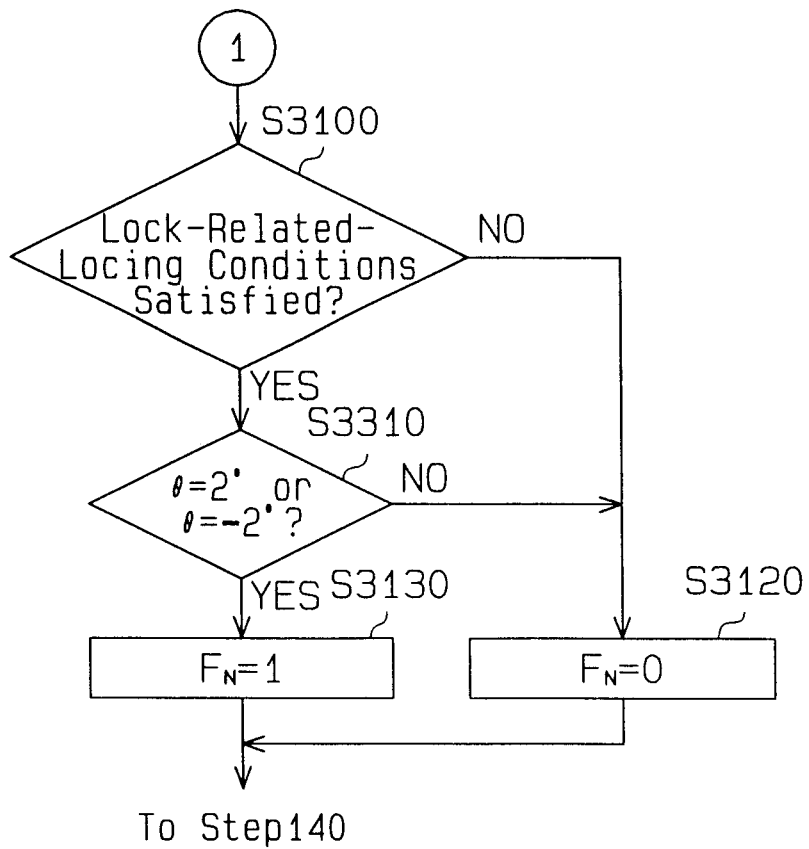
FIG. 12 is a continuation of the flowchart of FIG. 7 in the third embodiment.

A third embodiment according to the present invention will now be described with reference to FIGS. 11 and 12. The structure of this embodiment is the same as the first embodiment, however, some steps performed when executing axle pivot control are different. To avoid a redundant description, like or same reference numerals are given to those components and steps that are the same as the corresponding components and steps of the first embodiment.

In the second embodiment, the rear axle 10 is locked only when the absolute value of the pivot angle θ increases to 2°. However, in the third embodiment, the rear axle 10 is locked when the absolute value of the pivot angle θ decreases to 2° in addition to when the absolute value of the pivot angle θ increases to 2°, as shown by the arrows in FIG. 11.

In other words, the rear axle 10 is locked once the absolute value of the pivot angle θ reaches 2°. Afterward, the rear axle 10 remains locked regardless of the pivot angle θ until the load-related-locking conditions are no longer satisfied.

In the third embodiment, the program for axle pivot control, which is stored in the ROM 35, incorporates steps S10 to S90, which are illustrated in FIG. 7. The steps performed subsequently are illustrated in the flowchart of FIG. 12.

At step S3100, the CPU 34 judges whether or not the load-related-locking conditions are satisfied. If it is determined that the load-related-locking conditions are satisfied, the CPU 34 proceeds to step S3310. At step S3310, the CPU 34 judges whether or not the pivot angle θ is −2° or 2°. If it is determined that the pivot angle θ is neither −2° nor 2°, the CPU 34 proceeds to step S3120 and resets the flag $F_N$ to zero. If it is determined that the pivot angle θ is either −2° or 2°, the CPU 34 proceeds to step S3130 and sets the flag $F_N$ to one.

Therefore, the rear axle 10 is permitted to pivot freely if the pivot angle θ remains in the range of −2°<θ<2°. This prevents the road surface from affecting the stability of the vehicle if the forklift 1 travels while carrying a heavy load lifted to a high position. Accordingly, the riding comfort is also improved since the rear axle 10 is permitted to absorb impacts produced between the rear wheels 11 and the road surface.

As the body tilts laterally such that the absolute value of the pivot angle θ reaches 2° when the carried load is heavy and lifted to a high position, the rear axle 10 is locked. Thus, if the forklift 1 is transferring a heavy load lifted to a high position and the body starts to tilt laterally, the tilting is stopped at 2°. This stabilizes the forklift 1 when transferring loads.

Furthermore, if one of the rear wheel 11 rides over a bump, the elevation of the rear body portion of the forklift 1 is about half of that of the forklift 1 of the first embodiment, which locks the rear axle 10 in such case. This stabilizes the forklift 1 in the longitudinal direction. However, since the rear axle 1 remains unlocked, the forklift 1 of the first embodiment has superior stability in the lateral direction when the front wheels 7 ride over a bump.

If the forks 4 lift a heavy load to a high position when one of the rear wheel 11 rides over a bump and causes the absolute value of the pivot angle θ to be in the range of 2°<θ≦4°, the rear axle 10 continues to pivot freely. Thus, as the forklift 1 moves and the elevated rear wheel 11 rides off the bump, the rear wheel 11 follows the road surface and descends to a level surface. This stabilizes the vehicle. In this state, the rear axle 10 is locked when the absolute value of the pivot angle θ is 2°.

In the second embodiment, the rear axle is not locked when the absolute value of the pivot angle θ decreases to 2°. Thus, the rear axle 10 is kept unlocked afterward as long as the pivot angle θ remains in the range of −2°<θ<2°. This slightly decreases vehicle stability. However, in the third embodiment, the rear axle 10 is locked more frequently when a heavy load is lifted to a high position. This stabilizes the vehicle in the lateral direction. Furthermore, the third embodiment has the same advantages as the second embodiment.

A fourth embodiment according to the present invention will now be described with reference to FIGS. 13 and 14. The structure of this embodiment is the same as the first embodiment, however, some steps performed when executing axle pivot control are different. To avoid a redundant description, like or same reference numerals are given to those components and steps that are the same as the corresponding components and steps of the first embodiment.

Figure 13:
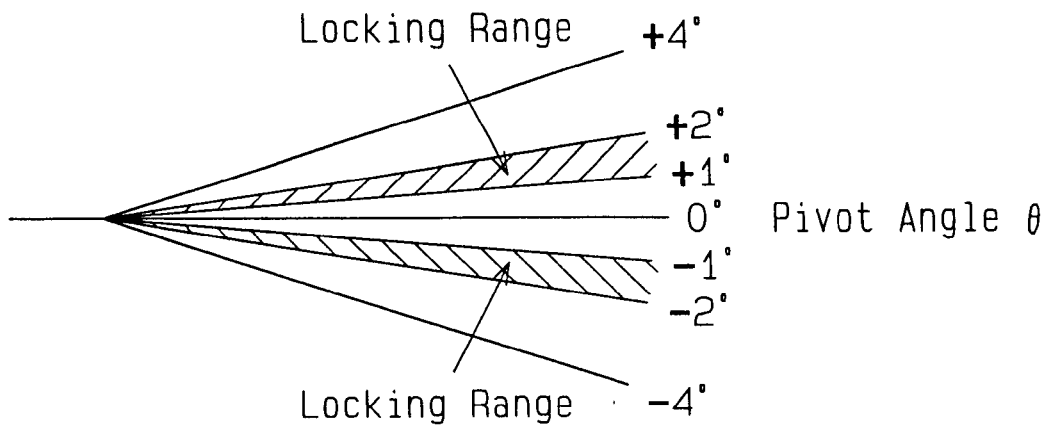
FIG. 13 is a chart showing the relationship between the pivot angle and the locking conditions in a fourth embodiment according to the present invention.
Figure 14:
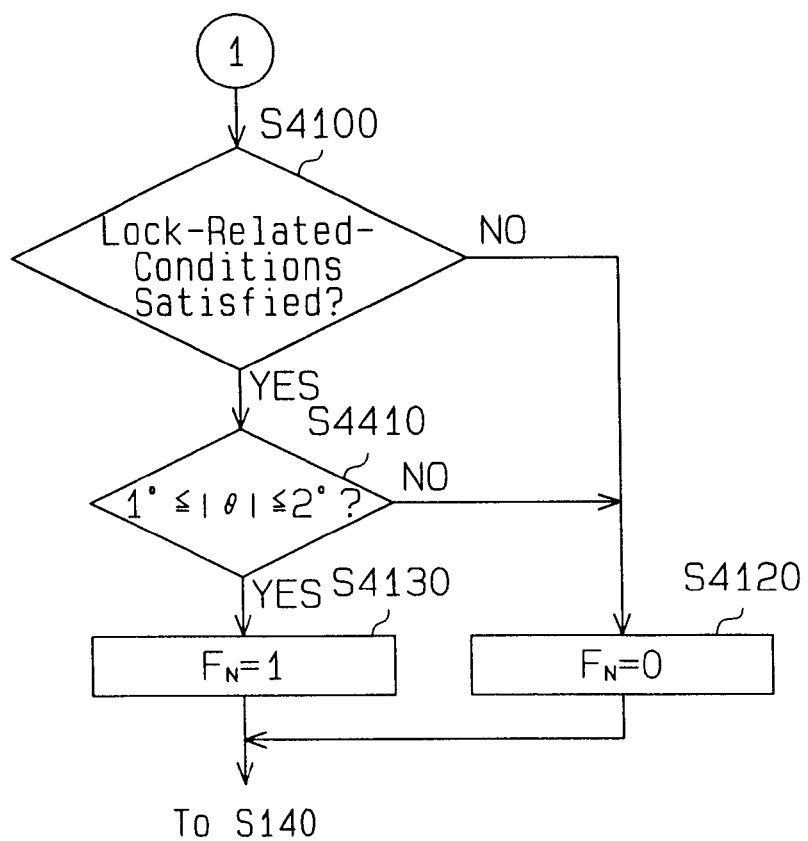
FIG. 14 is a continuation of the flowchart of FIG. 7 in the fourth embodiment.

As shown in FIG. 13, when the load-related-locking conditions are satisfied, the rear axle 10 is permitted to pivot freely if the absolute value of the pivot angle θ is included in the ranges of 0°≦|θ|<1° or 2°<|θ|≦4° and is locked if the absolute value of the pivot angle θ is included in the range of 1°≦|θ|≦2°. The range of 0°≦|θ|<1° defines a first range, while the range of 2°<|θ|≦4° defines a second range.

The rear axle 10 is locked if the absolute value of the pivot angle θ increases to one degree from the range of zero to one degree. The rear axle 10 is also locked if the absolute value of the pivot angle θ decreases to two degrees from the range of two to four degrees. The rear axle 10 is also locked if the absolute value of the pivot angle θ is included in the range of one to two degrees. The rear axle 10 remains locked regardless of the pivot angle θ until the load-related-locking conditions are no longer satisfied. In this embodiment, the program for axle pivot control, which is stored in the ROM 35, incorporates steps S10 to S90, which are illustrated in FIG. 7. The steps performed subsequently are illustrated in the flowchart of FIG. 14.

At step S4100, the CPU 34 judges whether or not the load-related-locking conditions are satisfied. If it is determined that the load-related-locking conditions are satisfied, the CPU 34 proceeds to step S4410. At step S4410, the CPU 34 judges whether or not the absolute value of the pivot angle θ is included in the range of 1°≦|θ|≦2°. If it is determined that the pivot angle θ is not included in this range, the CPU 34 proceeds to step S4120 and resets the flag $F_N$ to zero. If it is determined that the pivot angle θ is included in this range, the CPU 34 proceeds to step S4130 and sets the flag $F_N$ to one.

Therefore, the rear axle 10 is permitted to pivot freely if the pivot angle θ remains in the range of −1°<θ<1°. This prevents the road surface from affecting the stability of the vehicle if the forklift 1 travels while carrying a heavy load lifted to a high position. Accordingly, the riding comfort is also improved since the rear axle 10 is permitted to absorb impacts produced between the rear wheels 11 and the road surface.

As the body tilts laterally such that the absolute value of the pivot angle θ reaches one degree when the carried load is heavy and lifted to a high position, the rear axle 10 is locked. Thus, if the forklift 1 is transferring a heavy load lifted to a high position and the body starts to tilt laterally, the tilting is stopped at one degree. This stabilizes the forklift 1 when transferring loads.

Furthermore, if one of the rear wheel 11 rides over a bump, the elevated amount of the rear body portion of the forklift 1 is about half of that of the forklift 1 of the first embodiment, which locks the rear axle 10 in such case. This improves the stability of the forklift 1 in the longitudinal direction. However, since the rear axle 1 remains unlocked, the forklift 1 of the first embodiment has superior stability in the lateral direction when the front wheels 7 ride over a bump.

If the forks 4 lift a heavy load to a high position when one of the rear wheel 11 rides over a bump and causes the absolute value of the pivot angle θ to be in the range of 2°<θ≦4, the rear axle 10 continues to pivot freely. Thus, as the forklift 1 moves and the elevated rear wheel 11 rides off the bump, the rear wheel 11 follows the road surface and descends to a level surface. This stabilizes the vehicle. In this state, the rear axle 10 is locked when the absolute value of the pivot angle θ is two degrees. Like the third embodiment, in the fourth embodiment, the rear axle 10 is locked more frequently when a heavy load is lifted to a high position. This maintains vehicle stability in the lateral direction. Furthermore, the fourth embodiment has the same advantages as the second embodiment.

It should be apparent to those skilled in the art that the present invention may be embodied in many other specific forms without departing from the spirit or scope of the invention. More specifically, the present embodiment may be embodied by modifying the above embodiments as described below.

If the forklift remains stationary when lifting a load to a high position and one of the rear wheels 11 is elevated, it is preferred that the rear axle be locked to stabilize the vehicle. Thus, the rear axle can be controlled such that it is locked if the vehicle is not moving. More specifically, if the absolute value of the pivot angle θ is $2° \leq |\theta| \leq 4°$, the rear axle 10 is locked when the vehicle velocity is zero and remains unlocked when the vehicle velocity is not zero. In this structure, the locking of the axle when handling a load with the forklift in a stationary state stabilizes the vehicle. If the forklift starts to move from this state, the axle is unlocked. Thus, the wheel comes into contact with a level surface as it rides off a bump. This structure also has the same advantages as the preferred embodiments.

The axle pivot control, which is executed by referring to the pivot angle θ, is not limited to the above embodiments. The axle pivot control may be executed in any manner as long as pivoting of the rear axle is permitted when the absolute value of the pivot angle θ becomes greater than a predetermined angle (e.g., two degrees) during elevation of one of the rear wheels. For example, in the third embodiment, the pivot angle θ that locks the rear axle 10 may differ when the pivot angle θ increases and when the pivot angle θ decreases.

The value detected by the pivot angle sensor is used to control pivoting of the axle in the preferred embodiments. However, this value may also be used for other purposes.

The value for determining locking or unlocking of the rear axle need not be half (e.g., two degrees) the maximum pivot angle (e.g., four degrees) and may be changed arbitrarily. Even if the rear axle is locked when one of the rear wheels is elevated, the stability of the vehicle may be maintained and the impact, which is produced when the rear axle is unlocked causing the rear wheel to fall to the road surface, may be decreased as long as the wheel elevation amount is decreased. However, it is preferred that one of the rear wheels is not elevated when locking the rear axle.

In the preferred embodiments, the pivot angle is referred to when the load-state-related locking conditions are satisfied. The pivot angle may be referred to when the traveling-state-related conditions are satisfied to determine whether to restrict pivoting of the rear axle. For example, if the yaw acceleration $\Delta Y/\Delta T$ satisfies the locking condition, the pivot angle θ may be referred to. In this case, if the pivot angle θ exceeds a certain value, the rear axle may be locked during a predetermined period. In this structure, the axle is not locked when the yaw acceleration increases if one of the rear wheels is elevated and locked when the rear wheel reaches a level surface. This increases the frequency of locking the axle when the axle is not pivoted with respect to the body.

In the preferred embodiments, the load-related-locking conditions are not limited to a heavy load lifted to a high position. Detection of a state in which the vehicle's center of gravity is raised or detection of the possibility of such a state is the goal. For example, detection of either the load height or the load weight may be detected to determine whether the load-related-locking conditions are satisfied.

The present invention may be applied to an apparatus that uses a mechanism other than the damper to restrict pivoting of the rear axle.

The sensors that detect the traveling state of the vehicle are not related to the yaw rate sensor and the vehicle speed sensor as long as lateral acceleration and yaw acceleration can be estimated. For example, instead of using a yaw rate sensor, a tire angle detector may be employed to detect the steering angle (tire angle) of the rear wheels 11. In this case, the tire angle and the vehicle velocity V are used to compute the lateral acceleration $G_S$ (=V2/r) and the yaw acceleration $\Delta Y/\Delta T (=V\cdot\Delta(1/r)/\Delta T)$.

Lateral acceleration may be relied on as the sole physical quantity for detecting the traveling state. The yaw acceleration does not necessarily have to be used. Furthermore, the rate in which the lateral acceleration fluctuates ($\Delta G/\Delta T$) may be used in lieu of the yaw acceleration.

In the preferred embodiments, the judgement of the traveling-state-related conditions may be eliminated. In this case, only the load-state-related conditions are referred to when controlling pivoting of the axle.

The present invention may be applied to a battery-powered forklift. The present invention may also be applied to an industrial vehicle other than forklifts.

In the preferred embodiments, locking of the pivot axle does not require complete immobilization of the axle. Locking refers to a state in which the pivoting range of the axle is restricted to a very narrow range.

Furthermore, the term industrial vehicle as used herein is a vehicle driven by an operator to transfer loads. The load may include soil, people, or materials. Accordingly, industrial vehicles include heavy machinery such as power shovels or truck cranes.

Therefore, the present examples and embodiments are to be considered as illustrative and not restrictive, and the invention is not to be limited to the details given herein, but may be modified within the scope and equivalence of the appended claims.

What is claimed is:

1. An apparatus for controlling stability in an industrial vehicle, wherein the apparatus comprises:

an axle supported to pivot vertically relative to a body of the vehicle;

a pivot angle detector for detecting the pivot angle of the axle relative to the body;

a restricting mechanism for restricting pivoting of the axle, the restricting mechanism including a stopper located on the body of the vehicle, wherein the stopper restricts the pivoting of the axle to maintain the stability of the vehicle within a predetermined maximum range by the abutment between the stopper and the axle, wherein the predetermined maximum range is greater than a predetermined nonzero reference pivot angle, and wherein the pivoting of the axle is permitted if the absolute value of the pivot angle exceeds the predetermined nonzero reference pivot angle;

an operating status sensing device for sensing at least one of a motion status of the vehicle's motion when the vehicle turns and a load status of a load carried by the vehicle, wherein the load status indicates the position of the center of gravity of the vehicle, wherein the operating status sensing device includes a load status detector for detecting a first load state, in which the center of gravity is raised from a predetermined position, wherein the operating status sensing device further includes a motion status detector for detecting a first travel state, in which a value representing the motion status of the vehicle exceeds a predetermined value, wherein the motion status detector includes a first computing device for computing the lateral acceleration of the vehicle when the vehicle turns and a second computing device for computing the yaw acceleration when the vehicle turns; and a controller for selectively actuating and de-actuating the restricting mechanism by comparing the absolute value of the pivot angle with the predetermined nonzero reference angle when the first load state is detected by the load status detector, the controller selectively actuating and de-actuating the restricting mechanism in accordance with the status detected by the load status detector and the motion status detector.

2. The apparatus according to claim 1, wherein the pivot angle detector includes a pivot angle sensor employing a potentiometer.

3. The apparatus according to claim 1, wherein the axle is the rear axle, and wherein the restricting mechanism includes an electromagnetic valve for restricting extension and retraction of a damper arranged between the axle and the body.

4. The apparatus according to claim 1, wherein the industrial vehicle is a forklift truck.

5. The apparatus according to claim 1, wherein the controller de-actuates the restricting mechanism to free the axle when the load status detector detects the first load state and the absolute value of the pivot angle exceeds the predetermined reference angle.

6. The apparatus according to claim 5, wherein the controller actuates the restricting mechanism to restrict the axle when the load status detector detects the first load state and the absolute value of the pivot angle is equal to or smaller than the predetermined reference angle.

7. The apparatus according to claim 1, wherein the controller actuates the restricting mechanism when the motion status detector detects the first travel state.

8. The apparatus according to claim 1, wherein the load status detector includes a height sensor for detecting the position of the load carried by the vehicle and a pressure sensor for detecting the weight of the load.

* * * * *

UNITED STATES PATENT AND TRADEMARK OFFICE
CERTIFICATE OF CORRECTION

PATENT NO. : 6,719,098 B1
DATED : April 13, 2004
INVENTOR(S) : Kazuo Ishikawa et al.

It is certified that error appears in the above-identified patent and that said Letters Patent is hereby corrected as shown below:

<u>Column 6,</u>
Line 25, please delete "$\theta<2°$" and insert therefore -- $\theta>2°$ --

Signed and Sealed this

Twenty-seventh Day of July, 2004

JON W. DUDAS
*Acting Director of the United States Patent and Trademark Office*